United States Patent [19]

Watkins

[11] 4,021,003
[45] May 3, 1977

[54] POWER DRIVEN FISHING REEL

[76] Inventor: William B. Watkins, 1118 Crestwood Drive, Winston-Salem, N.C. 27101

[22] Filed: Jan. 8, 1976

[21] Appl. No.: 647,548

Related U.S. Application Data

[63] Continuation-in-part of Ser. No. 545,689, Dec. 2, 1974, abandoned, which is a continuation-in-part of Ser. No. 356,891, May 3, 1973, abandoned.

[52] U.S. Cl. ............................ 242/84.1 A; 242/215
[51] Int. Cl.² ...................................... A01K 89/017
[58] Field of Search ................ 242/84.1 A, 84.5 R, 242/211, 212, 217, 215, 84.51 R; 43/21

[56] References Cited

UNITED STATES PATENTS

| | | | |
|---|---|---|---|
| 2,162,774 | 6/1939 | Coxe | 242/212 |
| 2,190,398 | 2/1940 | Bugatti | 43/21 |
| 2,262,637 | 11/1941 | Fanshier | 242/84.1 A X |
| 2,714,271 | 8/1955 | Stratton | 43/21 |
| 2,760,736 | 8/1956 | Mihalko et al. | 242/84.1 A X |
| 3,215,359 | 11/1965 | Sanders | 242/84.1 A |
| 3,409,245 | 11/1968 | Grace | 242/84.1 A |
| 3,669,378 | 6/1972 | Miyamae | 242/84.1 A |

Primary Examiner—Billy S. Taylor
Attorney, Agent, or Firm—Grover M. Myers

[57] ABSTRACT

A fishing reel including a power-driven rewind assembly and a manually operated rewind unit which can be used separately or in combination. The reel has a single shaft upon which the power-driven assembly and manual unit are carried. An adaptor coupling is manipulated to allow engagement and disengagement of the power-drive assembly. The power-drive assembly has a variable friction drive unit which permits a variable friction force to be applied to a gear assembly of the power-drive unit.

7 Claims, 11 Drawing Figures

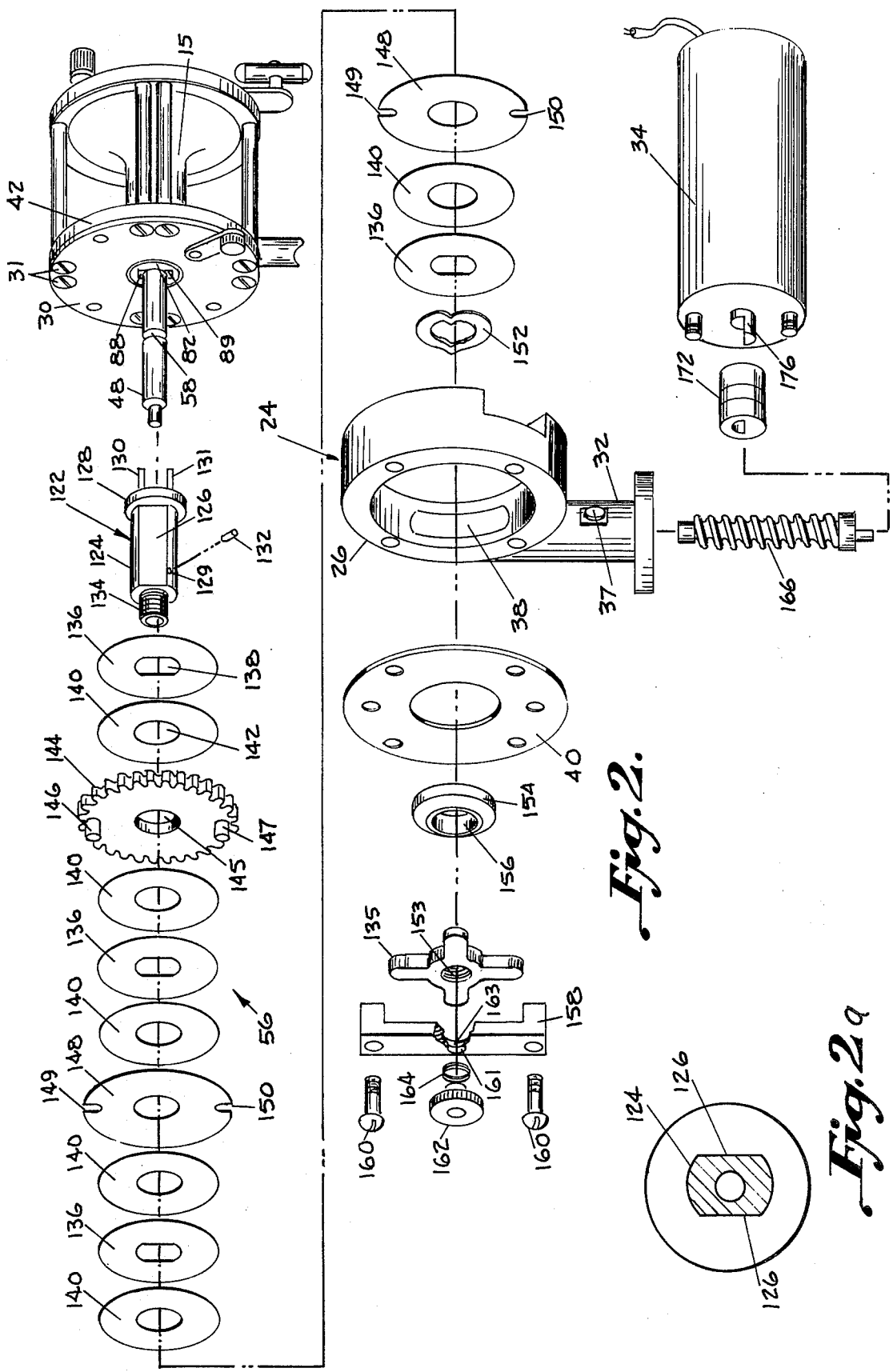

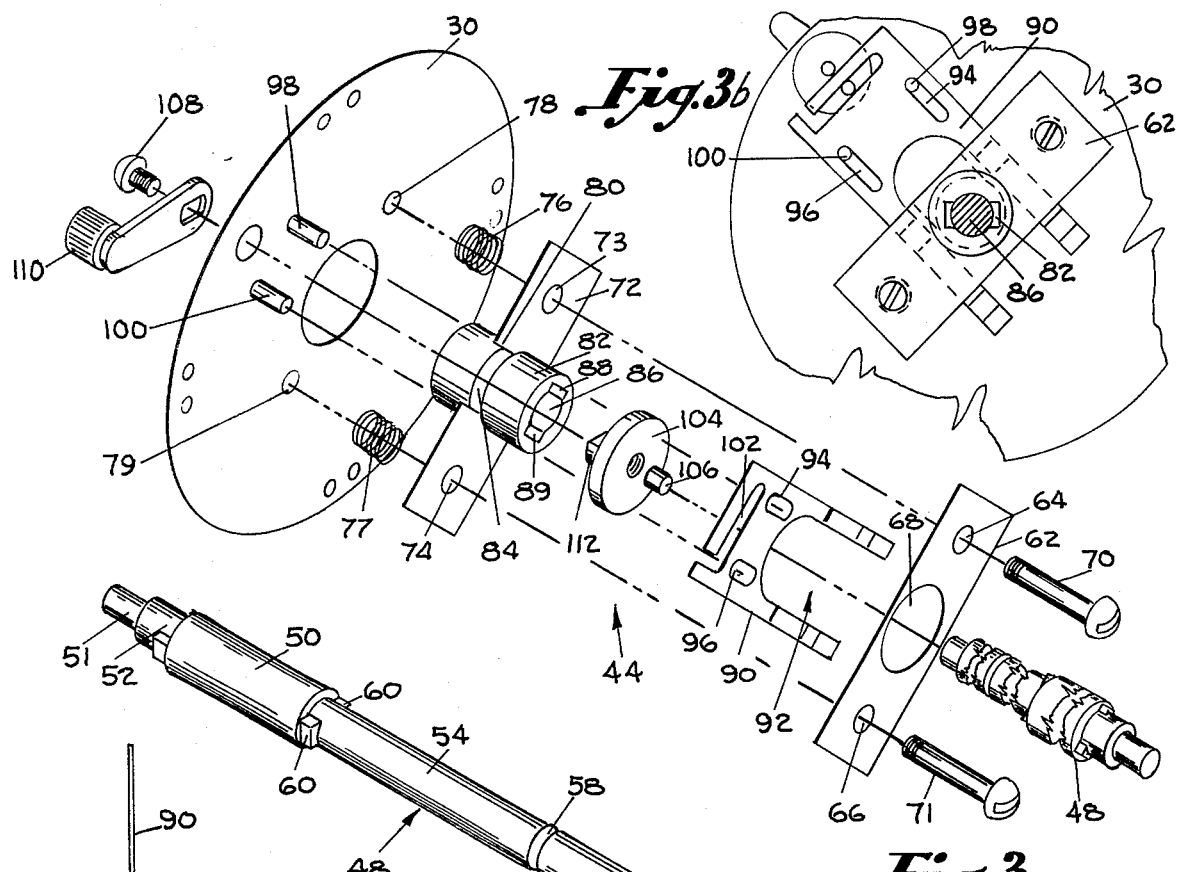
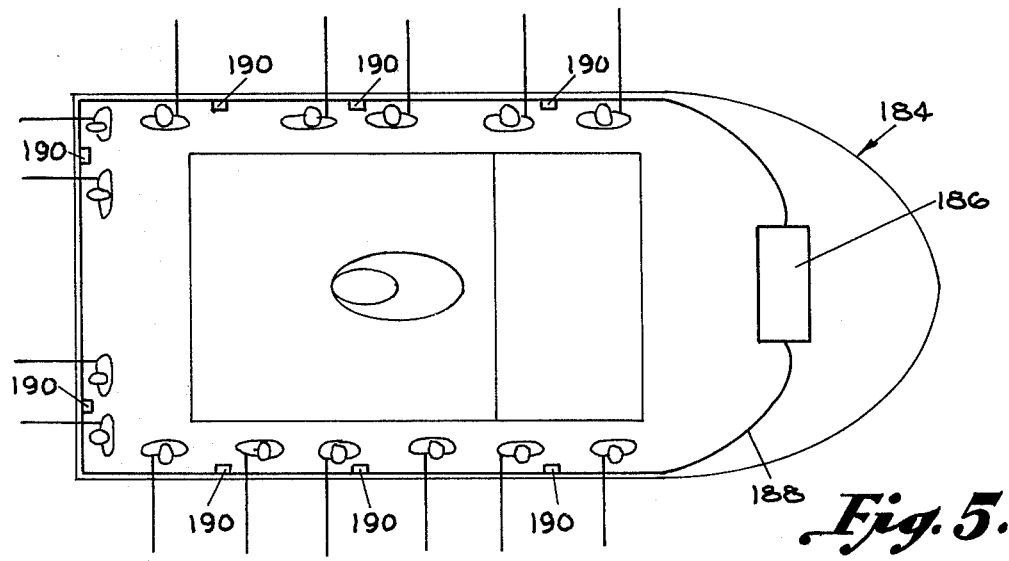

4,021,003

POWER DRIVEN FISHING REEL

This application is a continuation-in-part application of application Ser. No. 545,689 filed Dec. 2, 1974, now abandoned, which was a continuation-in-part application of Ser. No. 356,891 filed May 3, 1973 also abandoned.

BACKGROUND OF THE INVENTION

This invention relates to a deep-water fishing reel having a power-driven or manual mode of operation which can be used separately or simultaneously and includes a power transmission linkage that will permit a plurality of reels to be driven from a single power source.

Presently, there are numerous types of power-driven fishing reels in use. These power-driven reels are essential when deep-water fishing because of the length of line required. Although there are many types of reels available, each has its drawbacks which prevent one reel from being universally accepted by fishermen. Most of the presently used power-driven reels are very bulky and heavy primarily because the driving motor is attached directly to the reel or is carried on the fishing rod. Some of the reels have only a power-driving mechanism to rewind the line or bring in a catch so that a fisherman does not have the feel which is required and that he would normally have with a manually operated reel. Some of the presently known reels have both manual and power-drive capabilities for rewinding the line but generally one system must be disengaged before the other system can be utilized or the rewinding must be stopped before the power-driven mechanism can be engaged.

Furthermore, although drag and clutch mechanisms are known and have been used on power reels, they do not provide sufficient adjustment to permit the power-driven rewind mechanism and the manual rewind mechanism to operate simultaneously. Also, the presently used drag or clutch mechanisms do not provide a sufficient variation in the friction force which can be applied to permit a fisherman to have control and feel over the fishing rig.

Some of the many different types of power-driven reels presently known and having the above-mentioned problems are disclosed in the following patents: U.S. Pat. Nos. 2,190,398; 2,262,637; 2,760,736; 3,215,359; 3,669,378 and 3,874,610.

SUMMARY OF THE INVENTION

It is, therefore, an object of this invention to provide a small, durable, lightweight power-driven fishing reel for use in deep-water fishing.

Another object of this invention is to provide a deep-water, trolling and pier fishing reel which has both a power-driven and manual rewind mechanism which can function separately or can be operated simultaneously.

Another object of this invention is to provide a power-driven fishing reel which can be operated by a variety of power sources.

Another object of this invention is to provide a system in which a plurality of reels can be driven from a single power source.

Another object of this invention is to provide a power-driven reel which will permit the fisherman to maintain a feel control over the fishing rig.

Still another object of this invention is to provide a variable friction unit for use on a power-driven reel which will permit sufficient adjustment to allow a manual rewind mechanism to be operated simultaneously with a power-driven rewind mechanism and will permit adjustment of the friction force while the power-driven mechanism is in operation.

Still another object of this invention is to provide a power-driven reel which can be utilized with most conventional reels without major modification to the reel.

These and other objects are accomplished by the present invention through the use of a fishing reel having an elongated solid shaft extending through the fishing reel spool. The shaft is connected to and can be driven by a conventional manual rewind mechanism on one side of the spool while a power-driven rewind assembly is carried on the other side of the spool. The power-driven rewind assembly includes an adaptor coupling which permits the reel to operate either in a manual mode or power-driven mode, and in the power-driven and manual mode simultaneously. A power-drive actuating mechanism is provided to move the adaptor coupling to engage or disengage to the reel shaft. Carried on the reel shaft and engaging the adaptor coupling is a shaft sleeve which carries a gear assembly for driving the reel shaft and a variable friction drive unit which allows the friction force which is applied to the gear assembly to be varied. This variable friction drive mechanism permits a varying speed rewind with the use of a constant speed motor. The gear assembly can be connected directly to a drive motor or can be connected through a torque transmission link to a remote drive source.

BRIEF DESCRIPTION OF THE DRAWINGS

The foregoing and additional objects, features and advantages of the invention will be apparent to those skilled in the art by the following detailed description of a preferred embodiment taken with the accompanying drawings, in which:

FIG. 2 is a perspective of an exploded, detailed view of a power drive assembly including a gear mechanism, a variable friction unit and the shaft sleeve according to the present invention;

FIG. 2A is a cross section view of the shaft sleeve shown in the detailed assembly of FIG. 2.

FIG. 3 is a perspective of an exploded, detailed view of the power-drive actuating mechanism of the power-drive assembly which permits the variable friction unit to be engaged and disengaged from the reel shaft;

FIG. 3A is a side view of an actuation plate according to the present invention;

FIG. 3B is a front view of an assembled power-drive actuating mechanism viewed from behind the mounting plate;

FIG. 3C is a perspective of a solid elongated reel shaft according to the present invention;

FIG. 5 is a plan view of a fishing boat having a plurality of fishing stations remote from the power-drive source;

FIG. 7 is a torque transmission link which can be utilized between the reel power-drive assembly of the present invention and the remote fishing station illustrated in FIG. 6.

DESCRIPTION OF THE PREFERRED EMBODIMENT

Figure 1:
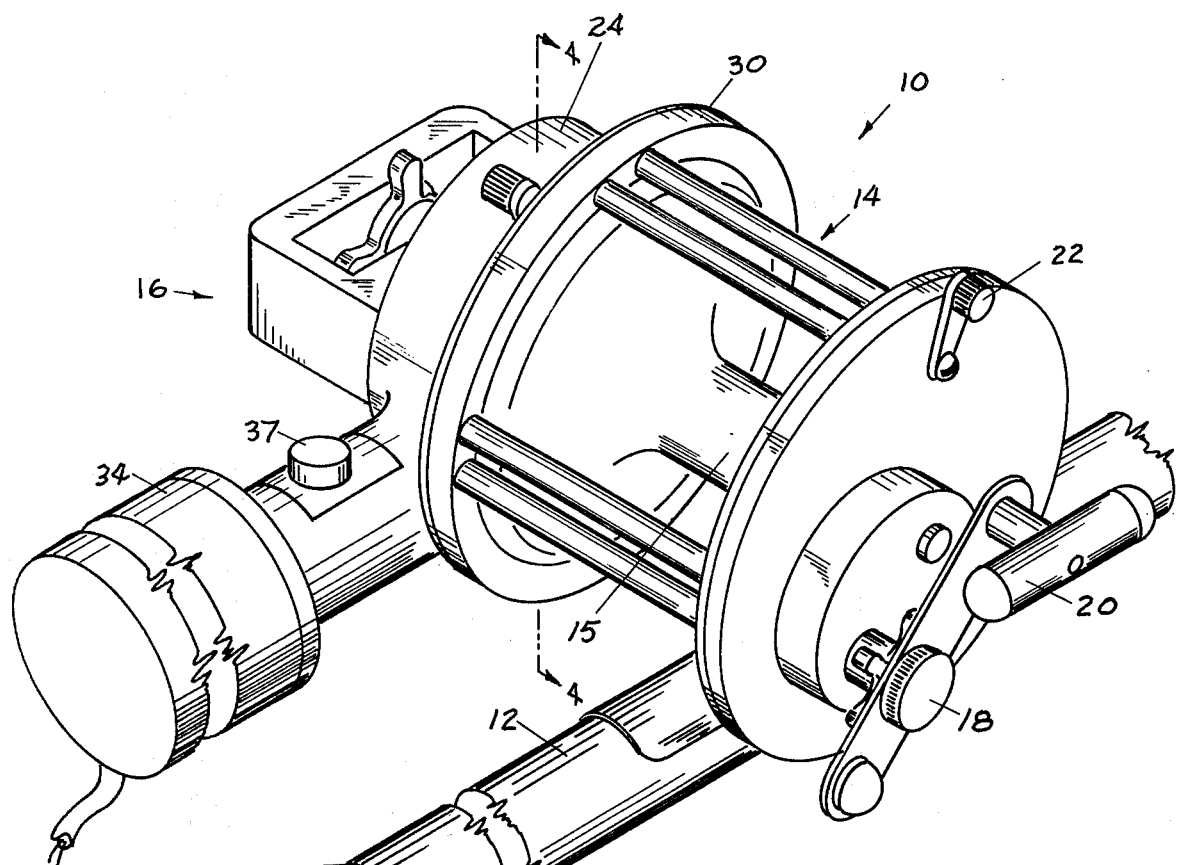
FIG. 1 is a perspective of a conventional rod and manual fishing reel with a power drive assembly of the present invention attached thereto.
Figure 1:
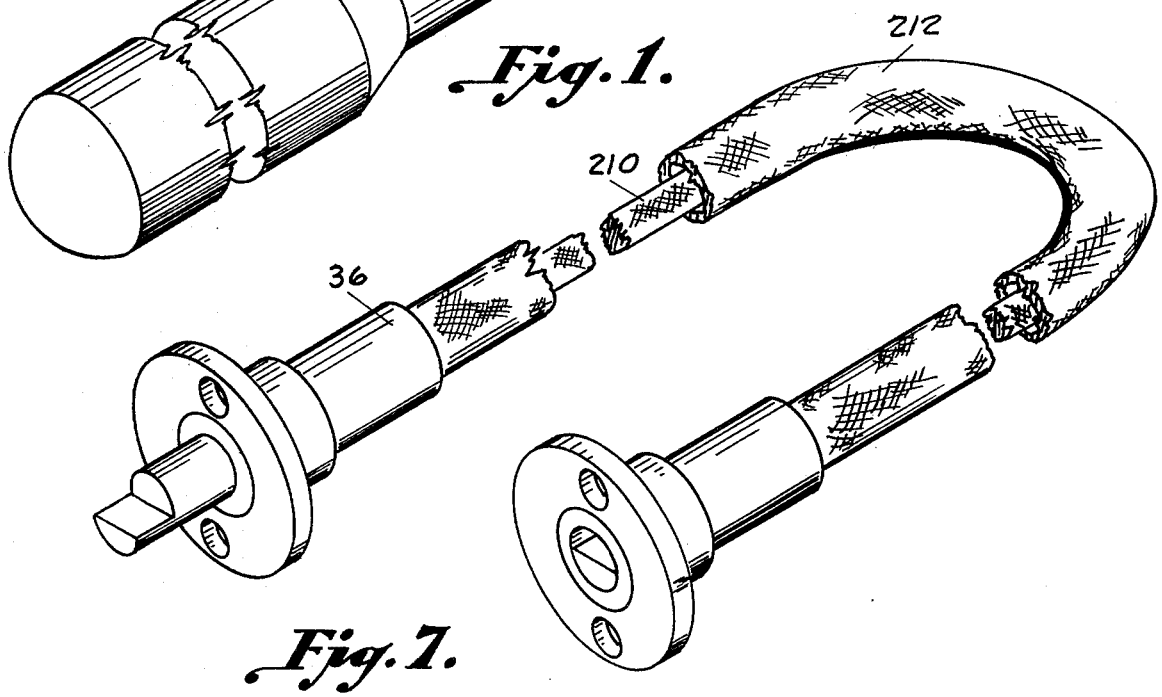

Referring more particularly to the drawings, the numeral 10 generally indicates a power-driven reel according to the present invention mounted on a conventional fishing rod 12. The reel 10 has a conventional reel portion 14 and a power-drive assembly 16. The conventional reel portion has a spool portion 15 and a manual actuating crank 18 with a handle 20 together with a selective brake and/or drag control 22 as is known in the art. The manual actuating crank has a mechanism which is well known in the art that permits it to be engaged or disengaged from the reel spool.

The power drive assembly 16 is secured to the opposite side of the reel spool portion and is enclosed in a housing 24 (see FIGS. 1 and 2). The housing 24 has an annular portion 26 and an end plate 40 which is secured to the outer surface of the annular portion to enclose a gear mechanism and variable friction unit which will be described hereinafter. It should be understood that the housing can be cast or molded in a single piece rather than having the annular portion and an end plate if desired. Of course, the housing is preferably made of a lightweight material such as aluminum to reduce the total weight of the reel. Extending from the bottom portion of the housing 24 is a tangential conduit 32 to which a drive motor 34 can be attached as shown in FIG. 1. In another embodiment of the invention, a torque transmission link unit 36 as illustrated in FIG. 7 can be utilized in place of the drive motor 34 as will be explained hereinafter. A push-button switch 37 is mounted on the tangential conduit 32 and is connected to the motor by appropriate circuit means as is known in the art. An elongated opening 38 is provided in the annular portion 26 of the housing and provides communication with the tangential conduit. A mounting plate 30 which is secured to the side of the reel spool portion with appropriate fasteners 31 has threaded apertures to receive fasteners (not shown) which extend through apertures in plate 40 and annular portion 26.

Located inboard of the mounting plate 30 and within the bell cavity of the spool of the conventional reel portion 14 is a power drive actuating assembly 44 illustrated in detail in FIG. 3. Extending through the spool 15 (see FIG. 2) of the conventional reel is a modified drive shaft 48 which can be rotated from either side of the spool (see FIG. 3C). The drive shaft has an enlarged portion 50 which is within the reel spool. Extending outwardly from one end of the enlarged portion and integrally formed therewith are consecutively smaller short cylindrical portions 51 and 52 of known design which are connected by a conventional gearing mechanism to the manual actuating crank 18 of the conventional reel in the usual manner. On the opposite side of the enlarged portion 50 and formed integrally therewith is an elongated cylindrical portion 54 which is smaller in diameter than the enlarged portion 50. The elongated portion 54 extends through the mounting plate 30 (see FIG. 2) and carries the power drive actuating assembly 44 and a variable friction drive unit 56 which will be described hereinafter. The shaft 48 has an annular groove 58 located near its outer end, as can be seen in FIG. 3 with a reduced cylindrical portion 59 at the end of the shaft.

At the juncture of the enlarged portion 50 and the elongated cylindrical portion 54 are two rectangular projections, ears or dogs 60 located 180° apart which can be formed integrally with the shaft or secured thereto by welding or other appropriate means. The cylindrical portion 54 of the shaft extends through a stationary plate 62 which has two threaded apertures 64 and 66 on opposite sides of a central opening 68. The stationary plate 62 is mounted on mounting plate 30 by two screw fasteners 70 and 71. The screw fasteners extend through a coupling plate 72 and have openings 73 and 74 aligned with threaded openings 64 and 66, respectively, on stationary plate 62. The fasteners 70 and 71 extend through compression springs 76 and 77 and are threaded into threaded apertures 78 and 79 in mounting plate 30.

The coupling plate 72 has a central U-shaped cut-out 80 which carries an adaptor coupling 82 which has an annular groove 84 into which the adaptor plate 72 fits. The adaptor coupling 82 has a central bore 86 and rectangular splines 88 and 89 which extend through the coupling. The splines are 180° apart and parallel to the axis of the coupling. Thus, the configuration of the aperture through the adaptor coupling is similar to the configuration of the ears 60 and shaft 54 configuration at the juncture of the enlarged portion 50 and the elongated shaft 54 of the reel shaft 48. The adaptor coupling can be manipulated to engage and disengage from the ears 60 of the reel shaft.

The manipulation of the adaptor coupling is accomplished by an actuation plate 90 which is inserted between coupling plate 72 and stationary plate 62. The actuation plate 90 has an elongated U-shaped cut-out 92 which permits the plate to fit around the adaptor coupling 82 but the opening is sufficiently large that the plate will not engage the adaptor coupling. Two spaced, elongated, parallel openings or slots 94 and 96 are located above the U-shaped opening 92 and are parallel to the sides of the actuation plate. The openings 94 and 96 fit over two spaced pins 98 and 100 carried on mounting plate 30. This pin and slot arrangement prevents the actuation plate from rotating and keeps the actuation plate in alignment. Another elongated slot 102 is located contiguous and parallel to the top edge of the actuation plate. A cam wheel member 104 carrying a pin 106 which is inserted into slot 102 of the actuation plate is secured on the mounting plate 30 by a fastener 108. A lever 110 is carried on a shaft portion 112 of the wheel which extends through the mounting plate. Movement of the lever 110 thus rotates the cam wheel 104 causing the actuation plate to move radially inwardly and outwardly with respect to the axis of the reel. Each finger of the actuation plate 90 has an upturned tab 114 (see FIG. 3A) and spaced upwardly from the lower end of the actuation plate is a second upturned tab 116 which can be appropriately secured to the actuation plate or formed integrally therewith by a suitable forming method. Tabs 114 and 116 are utilized to force coupling plate 72 away from the stationary plate 62 so that the adaptor coupling 82 may be disengaged from the ears 60 on the reel shaft 48. In this manner, the power drive portion of the reel may be disengaged. The lever 110 can be shifted to a drive position which places the stationary plate 62 in between tabs 114 and 116 on the actuating plate, thus, causing the compression springs 76 and 77 to force the coupling plate 72 towards the stationary plate 62 so that it engages the ears 60 on the reel shaft 48.

The power drive actuating mechanism, thus, permits the reel to be power driven or permits the power-drive mechanism to be disengaged through the adaptor coupling. The outer end of the adaptor coupling 82 is contiguous to the surface of the mounting plate 30 at center aperture 118 as can be seen in FIG. 2.

Engaging the outer end of the adaptor coupling 82 is a sleeve 122. The sleeve has a generally cylindrical portion 124 with flat sides 126 (see FIG. 2A). At one end of the cylindrical portion is an annular disc 128 which is preferably formed integrally with the rectangular portion. Extending from the cylindrical disc 128 are two rectangular projections 130 and 131 which are inserted in the splines 88 and 89 in the adaptor coupling 82 when the sleeve is positioned on the drive shaft 48. A pin 132 is inserted in aperture 129 to prevent lateral movement of the sleeve 122 on the drive shaft 48 by engaging groove 58 on the shaft. The opposite end of the sleeve has a cylindrical threaded portion 134 which is threaded to adjustment wheel 135 as it will be explained hereinafter.

Positioned on the cylindrical portion 124 of sleeve 122 adjacent the disc portion 128 is a friction disc 136 of brass or other suitable material having a flat-sided elongated, centered aperture 138 which is coincident to the size and shape of the cylindrical portion 124 of the sleeve. Adjacent the friction disc 136 is a friction washer 140 made of a compressible material such as leather or the like which provides the friction surface. The washer 140 has a circular central aperture 142. A circular gear 144 which is larger in diameter than the circular washer 140 and has a circular center opening 145 is carried on sleeve 122 and is positioned in contact with the circular washer. Circular gear 144 carries to pins 146 and 147 which are located 180° apart and are contiguous to the gear teeth. Pins 146 and 147 are spaced outward from the center of the gear a distance slightly larger than the radius of the friction washer 140. On the outer side of the gear 144, two sets of friction members are positioned. The sets include a friction washer 140, a friction disc 136, another friction washer 144 and a stationary friction washer 148. The stationary friction washer 148 is larger than the friction washer 140 and has peripheral notches 149 and 150 spaced 180° apart. The notches are engaged by pins 146 carried on the circular disc 144, thereby holding the disc 148 stationary with respect to the gear 144 and causing it to rotate with the gear. On the outside of the second stationary disc 148 is a friction washer 140 and a friction disc 136. As can be seen from this arrangement of friction members, there are 12 friction surfaces which permit the force applied to the circular gear wheel 144 to be varied over a wide range, thus, permitting the fisherman to adjust the friction drive force depending on the load applied to the reel. The center aperture 145 in the gear 144 is slightly larger than the cylindrical portion 124 of sleeve 122, thus, permitting the gear to rotate freely without rotating sleeve 124 when no friction force is applied to the gear.

Adjacent the last friction disc 136 is a pressure or tension washer 152 which is engaged by a spacer 154. The spacer 154 is in contact with an adjustment wheel 135 which has a threaded center aperture 153 that is screwed onto the threaded portion 134 of sleeve 124 as mentioned above. The adjustment wheel along with the spacer 154 are used to apply the pressure to the friction unit. The threaded portion 134 of sleeve 124 and the threaded aperture 153 are left-handed threads to prevent the wheel from becoming loose during reverse rotation of spool 15 and shaft 48. The aperture 156 in the spacer is sufficiently large to permit it to slip on the cylindrical portion 124 of the sleeve 122. A bracket 158 is fastened to the plate 40 of the housing 24 by screws 160. The bracket has a center bore 161 having an enlarged lower portion which carries a bushing 163 into which the end of portion 54 of shaft 48 is journaled which permits free rotation of the reel shaft. The upper portion of bore 161 is threaded and receives an adjustment cap screw 162 which has a bore in its stem. The reduced portion 59 of reel shaft 48 is inserted into the bore in the adjustment cap screw which provides a thrust bearing for the shaft. A spring 164 is positioned between the upper surface of the bracket 158 and the adjustment cap screw 162 and surrounds the cylindrical stem of the cap screw.

The variable friction unit and the manual drag unit arrangement provides both a rough and a precise friction adjustment while the reel is being power driven. Normally the variable friction unit is pre-set and, when a large fish is hooked and begins stripping too much line from the reel, the fisherman can make a rough variation in the friction load by simply engaging or bumping the adjustment wheel to cause the friction members to be tightened against one another. This is due to the left hand threads of the adjustment wheel. If the fisherman wants a more precise friction adjustment, he simply initiates the manual drag so that both the variable friction unit and the manual drag operate simultaneously. The manual drag unit can be more easily adjusted while the reel is being power driven, thus, a more precise friction adjustment can be made.

Figure 4:
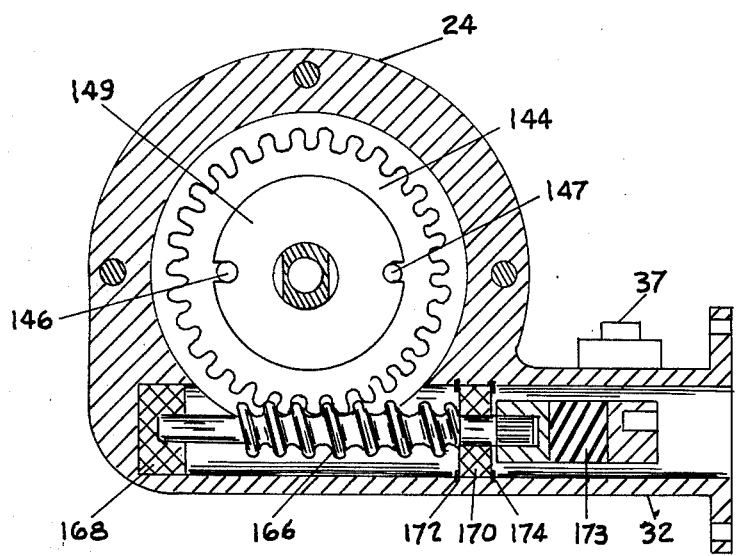
FIG. 4 is a section view taken along Line 4—4 of FIG. 1.

A worm gear 166 within the tangential portion 32 of the housing 24 engages the circular gear 144 through opening 38 (see FIG. 4). A bushing 168 carried with the housing receives one end of the worm gear 166. A second bushing 170 is carried in the tangential portion 32 of the housing 24 and is held in place by a pair of retaining rings 172 and 174. As can be seen in FIG. 4, the worm gear 166 has an angular pitch arrangement which produces a brake effect on the reel spool when the reel is in the power drive mode of operation and the power switch push-button 37 is released.

The outer end of the worm gear has a semi-cylindrical shaft which is inserted into a correspondingly shaped recess in a torque shear coupling 173. The opposite end of the torque shear coupling 173 also has a semi-cylindrical recess which receives a similar semi-cylindrical stud of shaft 176 of motor 34. The torque shear coupling is designed to shear off if a lock-up occurs at a pre-selected valve.

Figure 6:
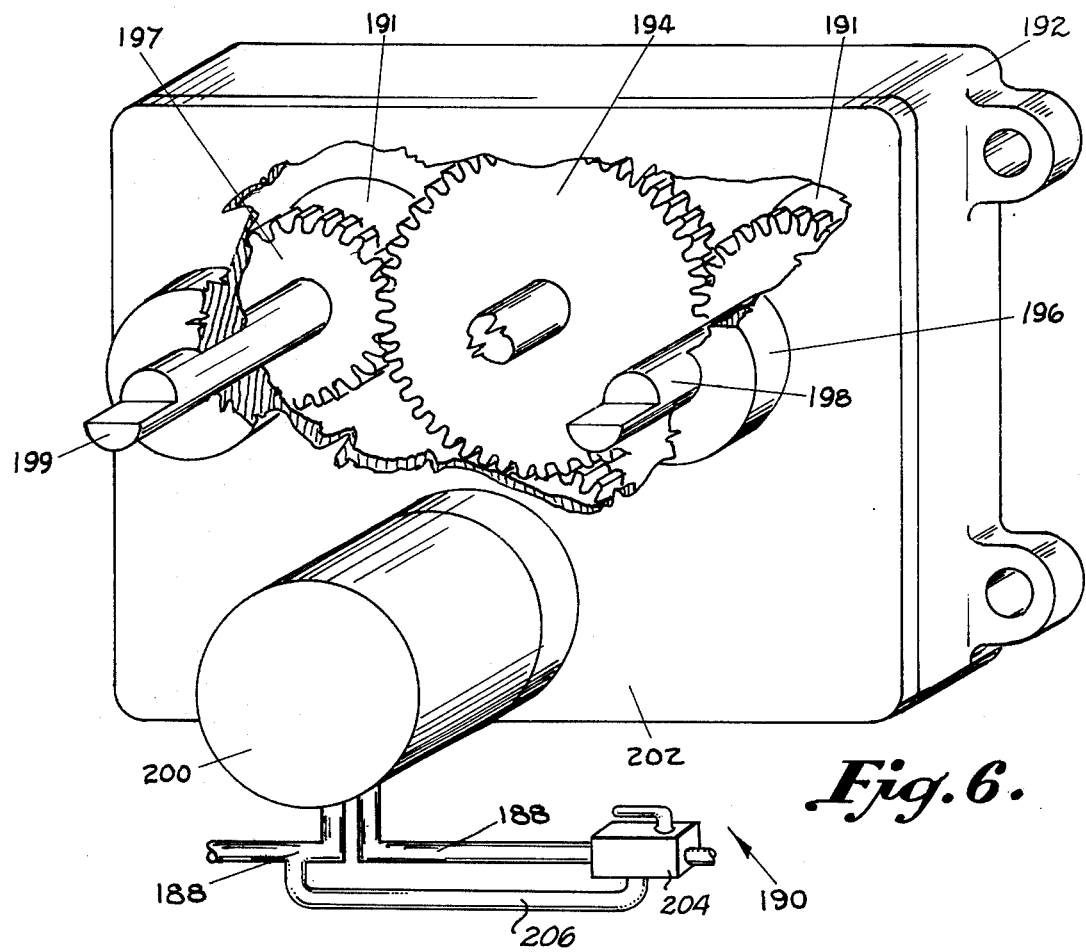
FIG. 6 is one embodiment of a fishing station having a plurality of power take-off connection according to the present invention.

As previously mentioned, the power-driven fishing reel herein described can also be used with power sources other than a D.C. electric power, such as hydraulic or pneumatic. Normally most deep-water fishing boats have a number of fishing stations along the side of the boat, as can be seen in FIG. 5. Most boats are equipped with some type of electrical power source, but also have a hydraulic power source and some even have pneumatic systems. FIG. 5. illustrates a fishing boat 184 having a central power source 186; for example, a hydraulic pump with lines 188 running to various remote stations 190. A remote station 190 is shown in detail in FIG. 6. The remote power station includes a gear box 192 which is secured to the fishing boat. The box contains a circular drive gear 194 suitably journaled therein contacting a pair of synchronizing mechanisms 191 which can be manually manipulated by a foot pedal or other suitable means to move a pair of drive gears 196 and 197 journaled in said box into engagement with said circular drive gear when power is decreased. Drive shafts 198 and 199 moving said drive gears extend through the top of the gear box and are provided to permit a torque transmission link 36, shown in FIG. 7, to be attached thereto. The torque transmission link has a flexible shaft 210 encased in a flexible sheath 212. Each end of the link shaft has the semi-cylindrical shape which permits it to mate with the drive shaft 198 or 199 while the other end mates with the torque coupling 173. By the remote arrangement, the reel will weigh less because the motor can be removed from the reel itself. The system would be driven by a fluid motor 200 (see FIG. 6) suitably journaled in the gear box 192 and having a circular gear 202 on its shaft which meshes with circular gear 194. The fluid motor 200 would receive its fluid supply, for example, hydraulic or pneumatic, through the lines 188 from the power source 186. A manually operated valve 204 is provided in line 188 adjacent each remote station 190 to permit the fluid to flow to the motor when the valve is in an open position or through a by-pass line 206 when the valve 204 is closed. Any suitable valve known in the art can be utilized. However, it should be recognized that any other power source which would provide a governed rotational power to the remote power station can be used and other arrangements can be used to connect a remote power source to the transmission link and activate the drive means.

It can be seen from the above description and drawings that this fishing reel provides a small durable and lightweight fishing reel for deep-water fishing. It also provides a fishing reel which can be power driven or manually operated or can be operated in both the power and manual modes simultaneously. Furthermore, the reel of the present invention provides a reel which can be operated remotely from a variety of power sources. By utilizing the manual mode of operation of the power reel, the fisherman is permitted to maintain feel control over the fishing rig. And, finally, the power drive variable friction unit of the present invention permits the fisherman control over the power of the reel while permitting him to vary the power while reeling in a catch.

This preferred embodiment may be modified in various ways such as providing various types of connections and disconnection assemblies varying the materials from which the parts can be made; however, these and other variations and changes can be made in the invention above described and illustrated without departing from the true spirit and scope thereof as defined in the following claims.

I claim:

1. In a fishing reel having a frame, a single shaft, a spool carried on said shaft and manual and power driven rewind units fro rotating said shaft, the improvement comprising:
   a. a housing for said power driven rewind unit secured to said frame;
   b. an adaptor coupling carried on said shaft, said adaptor coupling being adapted to engage and disengage from said reel shaft;
   c. an actuating means for manipulating said adaptor coupling so that said coupling will selectively engage or disengage said reel shaft;
   d. a sleeve carried on said shaft and engaging said adaptor coupling;
   e. a circular gear rotatably mounted on said sleeve;
   f. a plurality of friction members engaging said circular gear or one another, some of said friction members being rotatable with said circular gear while others being rotatable with said sleeve and free from said circular gear;
   g. a worm gear in said housing which meshes with said circular gear;
   h. drive means connected to said worm gear for supplying a rotary movement to said worm gear; and
   i. means for forcing said friction member into contact with one another and said circular gear, whereby a friction force is produced to cause said sleeve and said shaft to be rotated when said adaptor coupling is engaged with said shaft.

2. The fishing reel of claim 1, wherein said drive means includes:
   a. an electric motor; and
   b. a switch means for actuating said electric motor.

3. The fishing reel of claim 1, wherein said drive means includes:
   a. a hydraulic motor; and
   b. valve means for actuating said hydraulic motor.

4. The fishing reel of claim 1, wherein said drive means includes:
   a. a fluid motor; and
   b. a valve means for actuating said fluid motor.

5. The fishing reel of claim 1, wherein said drive means includes:
   a. a torque transmission link connected to said worm gear;
   b. a drive gear mechanism having a plurality of power take-offs gears, said torque transmission link being connected to one of said power take-off gears;
   c. synchronizing means for actuating said power take-off gears;
   d. means for actuating said synchronizing means; and
   e. motor means for driving said drive gear mechanism.

6. The fishing reel of claim 1, wherein said worm gear has angular pitch teeth which meshes with said circular gear so that the reel has a brake effect when the adaptor coupling is engaged with the reel shaft and no power is being supplied to the power drive rewind unit.

7. The fishing reel of claim 1, further including a torque shear coupling between said worm gear and said drive means to prevent said power drive unit from being damaged if said power drive unit becomes locked.

* * * * *